United States Patent [19]
Cai et al.

[11] Patent Number: 5,801,290
[45] Date of Patent: Sep. 1, 1998

[54] PROCESS FOR MAKING POLY(THIOETHER ETHER)S FROM DIALLYL ETHER AND DITHIOLS

[75] Inventors: Gangfeng Cai; Robert G. Gastinger, both of West Chester, Pa.

[73] Assignee: ARCO Chemical Technology, L.P., Greenville, Del.

[21] Appl. No.: 179,793

[22] Filed: Jan. 11, 1994

[51] Int. Cl.⁶ ................................................ C07C 213/08
[52] U.S. Cl. ........................................... 568/46; 568/50
[58] Field of Search ................................. 568/46, 50

[56] References Cited

U.S. PATENT DOCUMENTS

| | | | |
|---|---|---|---|
| 2,514,661 | 10/1950 | McMillan | 568/50 |
| 2,522,512 | 9/1950 | Harman et al. | 260/609 |
| 2,522,589 | 9/1950 | Vaughan et al. | 204/158 |
| 3,005,853 | 10/1961 | Wilgus | 260/609 |
| 3,519,689 | 7/1970 | Audouze et al. | 260/609 |
| 3,718,700 | 2/1973 | Esclamadon et al. | 260/609 R |
| 3,914,319 | 10/1975 | Dear et al. | 568/46 |
| 3,923,748 | 12/1975 | Hutt et al. | 260/77.5 R |
| 3,954,723 | 5/1976 | Oswald | 260/79 |
| 4,089,905 | 5/1978 | Singh | 260/609 R |
| 4,089,906 | 5/1978 | Singh et al. | 260/609 R |
| 4,284,761 | 8/1981 | Arendt et al. | 528/373 |
| 4,366,307 | 12/1982 | Singh et al. | 528/373 |
| 4,609,762 | 9/1986 | Morris et al. | 568/38 |
| 4,745,175 | 5/1988 | Scholl et al. | 528/380 |

OTHER PUBLICATIONS

Marvel et al., "J Am. Chem. Soc." 72 (1950) 1978.
Marvel et al., "J. Polym Sci 8" (1953) 313.
Marvel et al., "J. Am. Chem. Soc. 70" (1948) 993.
Vaughan et al., "J. Org Chem 7" (1942) 472.

*Primary Examiner*—Johann Richter
*Assistant Examiner*—Taofiq A. Solola
*Attorney, Agent, or Firm*—Jonathan L. Schuchardt

[57] ABSTRACT

Processes for making poly(thioether ether)s and hydroxy-terminated poly(thioether ether)s are disclosed. The poly(thioether ether)s are made by bulk free-radical polymerization of diallyl ether and an aliphatic $C_2$–$C_{10}$ dithiol. Liquid polymers are obtained when mixtures of two or more dithiols are used. Hydroxy-terminated products are obtained by reacting the poly(thioether ether)s with allyl alcohol under free-radical conditions.

14 Claims, No Drawings

5,801,290

1

PROCESS FOR MAKING POLY(THIOETHER ETHER)S FROM DIALLYL ETHER AND DITHIOLS

FIELD OF THE INVENTION

The invention relates to the preparation of polymers containing both ether and thioether groups. In particular, the invention includes a process for making poly(thioether ether)s from diallyl ether and dithiols, and polymer products made by the process.

BACKGROUND OF THE INVENTION

Sulfur-containing polymers are valuable intermediates for formulating polyesters, polycarbonates, and polyurethanes, especially coatings, elastomers, adhesives, and sealants. Commercial, fuel-resistant sealants use thiol-terminated poly(thioether ether)s prepared by condensation polymerization of bis(chloroethyl)-formal and sodium polysulfide. Unfortunately, these poly(thioether ether)s have thermally sensitive S—S linkages, and hydrolytically unstable —O—CH$_2$—O— groups, which makes sealants derived from these polymers unsuitable for wet or high temperature applications.

Other approaches to poly(thioether ether) compositions start with a sulfur-containing diol, and make the polymers by acid-catalyzed dehydration. This condensation polymerization strategy is described in U.S. Pat. Nos. 4,366,307 (Singh et al.), 4,609,762 (Morris et al.), 4,284,761 (Arendt et al.), and 4,745,175 (Scholl et al.). These polymers offer the advantages of sulfur-containing polyethers, particularly good chemical resistance, but have no thermally unstable S—S bonds, or hydrolytically fragile —O—CH$_2$—O— groups. However, because they require high temperatures, long reaction times, and vacuum stripping of water, dehydration processes such as those described in these patents are costly and labor and energy-intensive. In addition, the products often develop a high degree of unwanted color, which makes them unsuitable for some end uses. Improved methods for making thermally and hydrolytically stable, low-color sulfur-containing polyethers would be valuable.

Sulfur-containing polymers derived from the reaction of diallyl ether and hydrogen sulfide are well known (see, for example, U.S. Pat. Nos. 2,522,512, 2,514,661, and 2,522,589). It is also known to react ordinary diolefins with dithiols to make sulfur-containing polymers. For example, 1,6-hexanedithiol reacts with biallyl (1,5-hexadiene) to give polyhexamethylene sulfide (see *J. Am. Chem. Soc.* 72 (1950) 1978). Much less is known about reactions of ordinary dithiols such as 1,2-ethanedithiol or 1,4-butanedithiol with diallyl ether. Marvel and Cripps reported (*J. Polym. Sci.* 8 (1953) 313) that the reaction of 1,6-hexanediol and diallyl ether in cyclohexane solution under UV light produced no high polymer, while an emulsion polymerization technique gave a 42–50% yield of polymer.

The addition polymerization approach used to make poly(thioether ethers) from hydrogen sulfide is attractive because low-color products free of thermally and hydrolytically unstable bonds can be produced while avoiding the energy-intensive water-removal requirement of a condensation polymerization. On the other hand, it is desirable to find ways of preparing other useful poly(thioether ether) polymers besides those derived from hydrogen sulfide because H$_2$S, a gas at ordinary temperatures and pressures, is highly toxic and requires special handling techniques.

A preferred process would permit preparation of high yields of poly(thioether ether) polymers. Preferably, the process would avoid the difficulties of condensation polymerizations, but would give a low-color product having thermal and hydrolytic stability. An ideal process would also avoid the handling problems of hydrogen sulfide. A process that would give easily formulated, liquid poly(thioether ether)s having low melting ranges would be valuable.

SUMMARY OF THE INVENTION

The invention is a process for making a poly(thioether ether). The process comprises reacting diallyl ether with an aliphatic C$_2$-C$_{10}$ dithiol in a bulk polymerization process under free-radical conditions to produce a poly(thioether ether). We have surprisingly found that lower dithiols react quickly and completely with diallyl ether in a bulk polymerization process by addition polymerization to give high yields of poly(thioether ether)s. The products are thermally and hydrolytically stable compared with other types of sulfur-containing polymers used in the art, and are low in color. When at least two different dithiols are used, the reaction products are liquids that have DSC melting points less than about 0° C. These liquid products are easily formulated into many end-use products. The process is simple to perform, and avoids the use of toxic, hard-to-handle reactants such as hydrogen sulfide.

The invention includes a process for making hydroxy-terminated poly(thioether ether)s. In this process, a poly(thioether ether) prepared according to the process of the invention is further reacted with allyl alcohol under free-radical conditions to convert the —SH end groups to —OH end groups.

Liquid poly(thioether ether)s prepared by the process of the invention from the reaction of mixtures of dithiols with diallyl ether are also included in the invention. Other poly(thioether ether)s of the invention are derived from the reaction of diallyl ether with 1,2-ethanedithiol, 1,3-propanedithiol, and 1,4-butanedithiol. Finally, the invention includes hydroxy-terminated poly(thioether ether)s prepared from the reaction of poly(thioether ether)s and allyl alcohol.

DETAILED DESCRIPTION OF THE INVENTION

The invention includes a process for making a poly(thioether ether). This process comprises reacting diallyl ether with an aliphatic C$_2$-C$_{10}$ dithiol in a bulk polymerization process under free-radical conditions to produce the poly(thioether ether). Any suitable grade of diallyl ether can be used; technical and reagent-grade materials are fine for most purposes.

Suitable dithiols are aliphatic C$_2$-C$_{10}$ dithiols. The dithiols are linear, branched, or cyclic, and have primary, secondary, or tertiary —SH groups. Suitable examples include, but are not limited to, 1,2-ethanedithiol, 1,3-propanedithiol, 1,4-butanedithiol, 1,6-hexanedithiol, 1,8-octanedithiol, 2-methyl-1,3-propanedithiol, 3,3-dimethyl-1,5-pentanedithiol, 1,4-cyclohexanedithiol, and the like. Primary dithiols are preferred. Mixtures of dithiols can be used, and are preferred when liquid poly(thioether ether)s are desired.

The dithiol and diallyl ether can be combined in any desired proportion. When a polymer containing —SH end groups is desired, an excess of the dithiol is used. When a polymer containing —CH=CH$_2$ end groups is desired, diallyl ether is used in excess. Generally, the dithiol to diallyl ether mole ratio will be within the range of about 2:1 to about 1:2. When an —SH-terminated polymer is desired, the dithiol to diallyl ether ratio is preferably within the range of about 2:1 to about 1:1. When an olefin-terminated polymer is desired, the ratio is preferably within the range of about 1:1 to about 1:2.

The diallyl ether and dithiol are reacted in a bulk polymerization process under free-radical conditions. Bulk polymerization proceeds smoothly and gives high yields of the desired poly(thioether ether)s. The yields typically obtained are substantially higher than yields reported earlier for the solution or emulsion polymerization of 1,6-hexanedithiol and diallyl ether (see *J. Polym. Sci.* 8 (1953) 313).

Free-radical polymerization conditions are used. If desired, the reactants can simply be exposed to ultraviolet radiation to initiate polymerization. Preferably, a free-radical initiator is included in the mixture, and the reactants are photolyzed or heated, or both, under conditions effective to generate free-radical species. Suitable free-radical initiators are peroxide and azo compounds, such as, for example, benzoyl peroxide, di-tert-butyl peroxide, azobis (isobutyronitrile), and the like. Generally, the amount of free-radical initiator used, if any, will be within the range of about 0.01 to about 1 weight percent based on the amount of poly(thioether ether) produced.

The process of the invention can be performed at any desired temperature at which polymerization occurs. Generally, it is preferred to react diallyl ether and the dithiol at a temperature within the range of about 40° C. to about 100° C. A more preferred range is from about 60° C. to about 90° C.

If desired, the reactants can simply be combined and heated to the desired reaction temperature. Usually, it is more desirable to combine the reactants gradually because the reactions are exothermic, and gradual addition facilitates heat removal. In a preferred embodiment of the invention, a mixture of diallyl ether and a free-radical initiator is added gradually to the dithiol while the mixture is kept at a temperature effective to produce the poly(thioether ether).

The poly(thioether ether)s produced from the process of the invention will have a variety of molecular weights depending mostly upon the relative ratio of reactants used. Preferably, the poly(thioether ether)s will have number average molecular weights within the range of about 200 to about 5000. A more preferred range is from about 500 to about 1000.

The products made by the process of the invention are usually liquids or low-melting solids. Preferred products are made from mixtures of dithiols and have melting points (as measured by differential scanning calorimetry) of less than about 0° C.

The invention includes a process for making a hydroxy-terminated poly(thioether ether). In this process, a poly(thioether ether) having primarily —SH end groups is prepared by reacting, under free-radical conditions, diallyl ether with an excess of an aliphatic $C_2$–$C_{10}$ dithiol. The molar ratio of dithiol to diallyl ether is within the range of about 2:1 to about 1:1 so that the product has mostly —SH end groups. This poly(thioether ether) is then reacted with allyl alcohol under free-radical conditions to give a hydroxy-terminated poly(thioether ether). At least about 1 mole of allyl alcohol per mole of —SH is used.

The invention includes poly(thioether ether)s made by the process of the invention, including poly(thioether ether)s derived from the reaction of diallyl ether with 1,2-ethanedithiol, 1,3-propanedithiol, or 1,4-butanedithiol. Preferred poly(thioether ether)s have the formula:

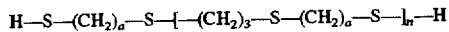

wherein n is an integer from 1 to 30; and a is an integer from 2 to 4. These polymers preferably have number average molecular weights within the range of about 200 to about 5000 as described above.

The invention also includes liquid poly(thioether ether)s derived from the reaction of diallyl ether with mixtures of at least two dithiols selected from the group consisting of 1,2-ethanedithiol, 1,3-propanedithiol, 1,4-butanedithiol, and 1,6-hexanedithiol. These poly(thioether ether)s preferably have number average molecular weights within the range of about 200 to about 5000 and DSC melting points less than about 0° C.

Hydroxy-terminated poly(thioether ether)s prepared by the process of the invention are also included. Preferred hydroxy-terminated poly(thioether ether)s have the formula:

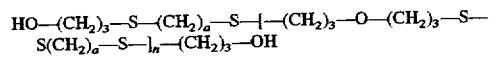

wherein n is an integer from 1 to 30; and a is an integer from 2 to 4.

The poly(thioether ether)s and hydroxy-terminated poly(thioether ether)s of the invention contain no thermally sensitive S—S linkages or hydrolytically unstable —O—$CH_2$—O— groups. This feature makes the polymers of the invention attractive intermediates for formulating polyesters, polycarbonates, and polyurethanes, especially those applications for which thermal and hydrolytic stability are important concerns.

The ability to use free-radical addition polymerization to make poly(thioether ether)s is a process advantage compared with the labor-intensive, acid-catalyzed condensation polymerization strategies commonly used in the art. While dehydration requires elevated temperatures, prolonged reaction times, and vacuum stripping to remove water, free-radical polymerization proceeds smoothly at lower temperatures and requires no water removal.

Condensation polymers, including poly(thioether ether)s made by dehydration methods, often contain trace impurities that make the products highly colored. The presence of color can limit the number of applications in which a polymer can be used, particularly in sealants and coatings. Poly(thioether ether)s made by the process of the invention are generally quite low in color, making them potentially suitable chemical intermediates for a wide variety of end uses.

Use of aliphatic $C_2$–$C_{10}$ dithiols in the process of the invention overcomes the handling concerns of using hydrogen sulfide. The aliphatic dithiols are easily handled liquids.

An important advantage of the invention is the flexibility it gives formulators in tailoring the melting characteristics of the poly(thioether ether). For many end-use applications, a key concern is whether or not a liquid polymer intermediate is available. The use of mixtures of two or more aliphatic $C_2$–$C_{10}$ dithiols gives liquid poly(thioether ether)s that show little or no tendency to crystallize upon cooling. When a solid polymer is preferred, the formulator can choose 1,2-ethanedithiol or 1,6-hexanedithiol, which usually give low-melting solid polymers. The melting range can be adjusted to suit the needs of the particular application.

The ability to easily convert —SH end groups to —OH end groups by reacting —SH-terminated poly(thioether ether)s of the invention with allyl alcohol provides added flexibility to formulators that need or prefer the reactivity of primary hydroxyl end groups.

Finally, the high yields of polymers obtained by bulk polymerization make the process commercially attractive. While earlier data from solution and emulsion polymerizations with diallyl ether and 1,6-hexanediol suggested that high yields of similar polymers may not be possible, we surprisingly found that bulk polymerization with a variety of aliphatic dithiols gives excellent yields of poly(thioether ether)s having molecular weights and melting characteristics that make them attractive as chemical intermediates for a variety of end-use applications.

The following examples merely illustrate the invention. Those skilled in the art will recognize many variations that are within the spirit of the invention and scope of the claims.

EXAMPLES 1–7

Preparation of Poly(thioether ether)s from Diallyl Ether and Dithiols (General Procedure)

A dithiol (5.5 mmol, see Table 1) is weighed into a long test tube equipped with a rubber septum, needle inlet, and magnetic stirring bar, and the dithiol is heated to 80° C. using an oil bath. A solution of diallyl ether (5.0 mmol) and azobis-(isobutyronitrile) (AIBN) (about 0.1 wt. % based on the total amount of reactants) is added gradually over 30 min. using a 1-mL syringe. The mixture is stirred at 80° C. for 3 h. The mixture is cooled to room temperature, and is washed with 3×10 mL of methanol. The polymer is dried in a vacuum oven at 70°–75° C. and 1 mm Hg for 18 h. The yield of polymer is calculated from the weight of the product. The polymer products, almost all colorless liquids, are characterized by gel-permeation chromatography (GPC) (polytetrahydrofuran standards), differential scanning calorimetry (DSC), and proton nuclear magnetic resonance spectroscopy ($^1$H NMR). The results of the polymer syntheses appear in Table 1.

The isolated yields of poly(thioether ether)s are generally excellent (78–95%), and indicate a quantitative or nearly quantitative conversion of monomers to polymer. Proton NMR analysis indicates that the polymers have only —SH terminal groups; no olefin-terminated products are detected. The —SH protons appear as characteristic multiple signals in the 0.8–1.3 ppm (chemical shift) range. Number average molecular weights are in the 500–1000 range; molecular weight distributions are fairly narrow ($M_w/M_n$=1.4–1.8). Melting ranges of the major portion of the product are below 0° C. when mixtures of dithiols are used, and crystallization rates are suppressed by using mixtures (Examples 5–7). Other than the polymers made from only 1,2-ethanedithiol or only 1,6-hexanedithiol, the molten products are generally not crystallizable when cooled from 140° C. to −60° C. at a rate of 20° C./min (see DSC results, Table 1).

EXAMPLE 8

Preparation of a Hydroxy-Terminated Poly(thioether ether)

Allyl alcohol (10 mL) is mixed, in a 100-mL single-neck round-bottom flask equipped with a magnetic stirring bar and a condenser, with 10 g of a thiol-terminated poly(thioether ether) derived from the reaction of 1,2-ethanedithiol and diallyl ether. The mixture is heated and stirred at 40° C. until the polymer dissolves in the allyl alcohol. AIBN (0.05 g) is added, and the mixture is heated to reflux (100° C.) for 5 h. After cooling to room temperature, residual allyl alcohol is removed using a rotary evaporator at 90°–95° C. The resulting polymer is washed with 5×50 mL of methanol, and is dried in a vacuum oven at 70°–80° C. and 1 mm Hg for 18 h prior to analysis. The product has a hydroxyl number of 124 mg KOH/g, which corresponds to a number average molecular weight of about 900. The product shows a single melting point by DSC of about 47° C. The proton NMR spectrum shows no —SH protons, and is consistent with a hydroxy-terminated poly(thioether ether) structure.

TABLE 1

Synthesis of Poly(thioether ether)s from Diallyl Ether and Dithiols

| | Example # | | | | | | |
|---|---|---|---|---|---|---|---|
| | 1 | 2 | 3 | 4 | 5 | 6 | 7 |
| | Mmoles of dithiol per 5.0 mmoles of diallyl ether[1] | | | | | | |
| 1,2-ethane-dithiol | 5.50 | | | | 2.25 | 2.25 | 2.25 |
| 1,3-propane-dithiol | | 5.50 | | | 2.25 | | |
| 1,4-butane-dithiol | | | 5.50 | | | 2.25 | |
| 1,6-hexane-dithiol | | | | 5.50 | | | 2.25 |
| Polymer yield (%) | 95 | 84 | 88 | 78 | 94 | 89 | 78 |
| GPC | | | | | | | |
| $M_n$ | 740 | 860 | 800 | 810 | 710 | 750 | 770 |
| $M_w/M_n$ | 1.8 | 1.5 | 1.5 | 1.4 | 1.6 | 1.6 | 1.5 |
| Melting point[2] (°C.) (main peak) | 38 | 0 | −1 | 16 | −8 | −7 | −6 |
| Cryst. temp.[2] (°C.) | −4 | N[3] | N | −15 | N | N | N |

[1]Each reaction includes about 0.1 wt. % azobis(isobutyronitrile) (AIBN) as an initiator.
[2]Data from DSC at a heating or cooling rate of 20° C./min.
[3]N: polymer melt does not crystallize when cooled from 140° C. to −60° C. at 20° C./min.

The preceding examples are meant only as illustrations. The following claims define the scope of the invention.

We claim:

1. A process for making a poly(thioether ether), said process comprising reacting diallyl ether with an aliphatic $C_2$–$C_{10}$ dithiol in a bulk polymerization process under free-radical conditions to produce a poly(thioether ether).

2. The process of claim 1 wherein the dithiol is selected from the group consisting of 1,2-ethanedithiol, 1,3-propanedithiol, 1,4-butanedithiol, and 1,6-hexanedithiol.

3. The process of claim 1 wherein at least two different dithiols are used, and the reaction product has a DSC melting point less than about 0° C.

4. The process of claim 1 wherein a mixture of diallyl ether and a free-radical initiator is added gradually to the dithiol and is reacted at a temperature effective to produce the poly(thioether ether).

5. The process of claim 4 wherein the reaction temperature is within the range of about 40° C. to about 100° C.

6. The process of claim 1 wherein the resulting poly(thioether ether) has a number average molecular weight within the range of about 200 to about 5000.

7. The process of claim 1 wherein the diallyl ether to dithiol molar ratio is within the range of about 2:1 to about 1:2.

8. A process for making a liquid poly(thioether ether), said process comprising reacting diallyl ether with at least two different dithiols selected from the group consisting of 1,2-ethanedithiol, 1,3-propanedithiol, 1,4-butanedithiol, and 1,6-hexanedithiol, in a bulk polymerization process under free-radical conditions to produce a liquid poly(thioether ether).

9. The process of claim 8 wherein a mixture of diallyl ether and a free-radical initiator is added gradually to the dithiols and is reacted at a temperature effective to produce the liquid poly(thioether ether).

10. The process of claim 8 wherein the reaction temperature is within the range of about 40° C. to about 100° C.

11. The process of claim 8 wherein the liquid poly(thioether ether) has a DSC melting point less than about 0° C.

12. A process for making a hydroxy-terminated poly(thioether ether), said process comprising reacting, under free-radical conditions, diallyl ether with an aliphatic $C_2$–$C_{10}$ dithiol in a bulk polymerization process, wherein the molar ratio of the dithiol to diallyl ether is within the range of about 2:1 to about 1:1, to produce a poly(thioether ether) that has primarily —SH end groups, and reacting the poly(thioether ether) with at least about 1 mole of allyl alcohol per mole of —SH end group to produce a hydroxy-terminated poly(thioether ether).

13. The process of claim 12 wherein the dithiol is selected from the group consisting of 1,2-ethanedithiol, 1,3-propanedithiol, 1,4-butanedithiol, and 1,6-hexanedithiol.

14. The process of claim 12 wherein at least two different dithiols are used, and the reaction product has a DSC melting point less than about 0° C.

* * * * *